US007693712B2

(12) United States Patent
Gaeta et al.

(10) Patent No.: US 7,693,712 B2
(45) Date of Patent: Apr. 6, 2010

(54) CONTINUOUS SPEECH PROCESSING USING HETEROGENEOUS AND ADAPTED TRANSFER FUNCTION

(75) Inventors: Michel Gaeta, La Seyne sur Mer (FR); Abderrahman Essebbar, Nice (FR)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 990 days.

(21) Appl. No.: 11/389,286

(22) Filed: Mar. 27, 2006

(65) Prior Publication Data

US 2006/0217977 A1 Sep. 28, 2006

(30) Foreign Application Priority Data

Mar. 25, 2005 (FR) .................................. 05 03008

(51) Int. Cl.
*G10L 21/02* (2006.01)
*G10L 15/20* (2006.01)

(52) U.S. Cl. ........................ 704/226; 704/205; 704/233

(58) Field of Classification Search ....................... None
See application file for complete search history.

(56) References Cited

U.S. PATENT DOCUMENTS

| | | | | |
|---|---|---|---|---|
| 5,574,824 | A * | 11/1996 | Slyh et al. | 704/226 |
| 7,099,821 | B2 * | 8/2006 | Visser et al. | 704/226 |
| 7,171,008 | B2 * | 1/2007 | Elko | 381/92 |
| 2003/0040908 | A1 * | 2/2003 | Yang et al. | 704/233 |
| 2004/0138882 | A1 | 7/2004 | Miyazawa | |
| 2007/0033020 | A1 * | 2/2007 | Francois et al. | 704/226 |

FOREIGN PATENT DOCUMENTS

| | | | |
|---|---|---|---|
| JP | 2-244099 | A | 9/1990 |
| JP | 2004-020679 | A | 1/2004 |
| JP | 2004-198810 | A | 7/2004 |
| JP | 2004-206063 | A | 7/2004 |
| WO | WO 00/14731 | A1 | 3/2000 |

OTHER PUBLICATIONS

A. Hussain et al., "Novel Wiener Sub-Band Processing Schemes for Binaural Adaptive Speech-Enhancement", Multi Topic Conference, 2003, INMIC 2003, 7th International Islamabad, Pakistan 8-9, Piscataway, NJ, USA, IEEE, Dec. 8, 2003, pp. 1-6.
A. Hussain et al., "Multi-Sensor Sub-Band Adaptive Noise Cancellation for Speech Enhancement in an Automobile Environment", IEE Conference Proceedings, Oct. 29, 1997, pp. 1-7.
French Search Report dated Jul. 25, 2007.

* cited by examiner

*Primary Examiner*—Matthew J Sked
(74) *Attorney, Agent, or Firm*—Buchanan Ingersoll & Rooney PC

(57) ABSTRACT

A pre-processing system of a signal of interest in an automatic speech recognition system in a vehicle, includes an acoustic sensor to sense the signal of interest, a non acoustic sensor to sense a non acoustic noise signal, a pre-processing unit of the signal of interest, comprising a processing section of coherent frequency bands signals for suppressing the noise from the received signal, a processing section of non coherent frequency bands signals, comprising transfer function estimation device of a signal through the vehicle cabin, and a methods selection section for determining the coherence properties of the received signal, and for selecting the processing section of coherent frequency bands signals or the processing section of non coherent frequency bands signals depending on the result of the properties of the received signal.

9 Claims, 3 Drawing Sheets

CONTINUOUS SPEECH PROCESSING USING HETEROGENEOUS AND ADAPTED TRANSFER FUNCTION

FIELD OF THE INVENTION

The current invention is directed to a continuous pre-processing of speech signals for an automatic speech recognition system and in particular for a system used in vehicles. From the safety point of view, it is preferable that a driver of a vehicle can give vocal commands for activating some functions of the vehicle. However, because the vehicle environment is often very noisy and contains several noise sources, such as from wind, tires rolling, mechanical vibrations, audio system, wipers, blinker signal, etc., it is necessary to first process the signals before their interpretation by the automatic speech recognition system in order to be able to correctly extract the vocal commands.

In this description, the term "noise" means both noise and interferences.

More precisely, the invention concerns the pre-processing of the vocal command signal before this signal is entering in the automatic speech recognition system. If the signal quality is improved by pre-processing, the system becomes more reliable and so, will be better accepted by the users.

BACKGROUND OF THE INVENTION

Filtering noise from the signal in order to obtain a better quality of a vocal signal before its interpretation is known. The FIG. 1 shows the general principle of the command signal processing by filtering the noise before presenting the vocal signal to the automatic speech recognition system. The vocal signal s(n) is disturbed by a noise signal d(n) and the resulting signal is y(n). This signal y(n) enters in a pre-processing unit 2 in order to improve the signal quality by filtering the noise. The filtered signal s(n) is provided as output and is presented to an automatic speech recognition module 63. However, in most situations, because the noise consists in multiple heterogeneous sources which are difficult to model, it is often very difficult, and even impossible, to define an efficient filter which can effectively reduce the noise components. Furthermore, an inappropriate determination of the filter, based on wrong noise models or an inaccurate estimation, can even lead to a partial destruction of the vocal signal making the pre-processing sometimes worse than if nothing had been performed.

Several solutions had been proposed for improving the vocal signal quality. For example, it is known that the usage of a microphone array combined with a beam forming control increases the gain of the received signal in particular directions and makes a system less sensitive to directional noise and interference. However, those systems, to be efficient, can become costly because of the usage of the microphone array, and are not easy to integrate considering the constraints concerning the interior esthetic of vehicles. Furthermore, such systems remain very limited for performances because directional interferences inside of vehicles are not the major disturbances, so that those systems can only partially solve the problem or can only solve the problem in a very limited number of configurations.

Among the other proposed solutions, noise or interference reduction is based on the addition of a noise reference sensor to obtain a reference signal of the noise. For example, it is possible to place a first microphone close to the driver, and a second microphone far from him. The first microphone gets the signal of interest, meaning the vocal command, while the second microphone only senses, in principle, the noise signal. However, in practice, this solution is not satisfactory because it is very difficult to simultaneously obtain a representative signal of the local noise around the speaker at a microphone which is far from the speaker/driver. If the microphone is far from the speaker, an approximate reference of the noise is generated and this approximate noise reference is unusable and can be even inappropriate for the system as explained above. If, on the other hand, the second microphone is put too close to the speaker, the noise component in the received signal can be more representative of the local noise around the speaker but it would be impossible to avoid a contribution and a mixing (or leakage) of the signal of interest in the signal of the second microphone. This could lead in a partial and even total destruction of the signal of interest because, in this case, the signal of interest will itself be considered as a noise component and will be suppressed by the noise subtraction process.

In other proposed solutions for solving this problem, architectures exist which integrate non acoustic sensors which can be considered as a means to define the noise reference. For example, in Japanese patent JP2244099 assigned to AISIN SEIKI Company, illustrates talk with the usage of the electric signal delivered to the loudspeaker of the audio system as a source of noise reference. The advantage of such sensors is the avoidance of the leakage of the signal of interest in the noise reference, because, in this case, the reference signal is no longer an acoustic signal containing a contribution of the acoustic signal of interest. For example, a vibration phenomenon can be detected. In a general manner, two types of sensors can be distinguished: the sensors in contact with the speaker body and those without contact with the speaker body. The first type of sensors is, obviously, very constraining for the application to a vehicle driver and is not interesting in our case. The second seems more appropriate for the type of envisaged applications and will be considered in the description of the invention.

Another possibility to filter the noise signal consists of estimating the noise component before the beginning of the reception of the speech signal and subtracting it from the received signal during the entire period of reception of the mixed signal composed of the signal of interest and the noise. Under these conditions, in order to perform this operation with reliability, it is necessary to use a voice activity detector in order to know the speech period and subtract the estimated noise signal from the received signal. The estimation of the noise is obtained just before the begin of the speech signal. To do so, the speech signal is considered to be greatly superior in energy compared to the surrounding noise signal. Hence, by using a threshold on the received signal energy, the speech signal reception period can be detected and the previously estimated noise can be suppressed according to the principle previously described. However, this detection principle based on energy threshold is not robust, for example, in the case of sounds with fricative consonance. Furthermore, the principal and implicit assumption of such process is that the noise does not evolve during the reception of the speech signal. However, for the type of concerned applications, the environment of the vehicle imposes other constraints which lead in general to an environment where the noise and interferences are not constant, and can vary with the vehicle speed (acceleration or deceleration), the output of the audio system, the activation of the wipers, the blinkers, etc. One can easily understand that the implicit and restrictive assumptions made are not applicable for the considered cases. Therefore it is necessary to take into account this noise variation during the reception of the speech signal and to realize a continuous noise reduction is operational even during the speech signal reception without any stationary assumptions concerning the noise component.

SUMMARY OF THE INVENTION

Hence, the current invention has the objective to overcome the drawbacks and problems as mentioned above. More precisely, one of the objectives of the current invention is to overcome these drawbacks by a pre-processing unit of the signal of interest for an automatic speech recognition system for a vehicle which is accurate, reliable and cheap.

This objective as well as some others are obtained thanks to a signal of interest pre-processing unit for an automatic speech recognition system in a vehicle comprising: at least one acoustic sensor for sensing the signal of interest emitted by a vehicle driver, at least one non acoustic sensor to sense a non acoustic noise signal existing in the vehicle, a signal of interest pre-processing unit, one first conditioning unit linking the non acoustic sensor to the pre-processing unit through a first filter bank, a second conditioning unit linking the acoustic sensor to the pre-processing unit through a second filter bank, where the first and second filter banks are settled to divide a received signal in a plurality of sub-bands of frequencies, the pre-processing unit comprising: a section for processing signals with coherent frequency bands dedicated to suppress the noise from the signal provided by the first filter bank, a section for processing signals with non coherent frequency bands, the section of processing signals with non coherent frequency bands comprising an estimation mean of the transfer function of a signal through the vehicle cabin, a section of method selection for determining the coherence properties of the received signal from the first and second filter banks, and to select the section for processing signals with coherent frequency bands or the section for processing signals with non coherent frequency bands depending on the result of the received signal properties.

In a preferred embodiment, the signal of interest pre-processing system further comprises a voice activity detector to automatically deactivate or activate the update, in the estimation means, the transfer function of the system when a signal of interest is detected.

Preferably, the signal of interest pre-processing system further comprises a non acoustic speech sensor to provide a signal to the voice activity detector.

It is obvious that the usage of this pre-processing is not limited to the application for automatic speech recognition in a vehicle.

BRIEF DESCRIPTION OF THE DRAWINGS

Hereafter is described, for purpose of example, a preferred embodiment of the invention realization by reference to the attached figures in which.

DESCRIPTION OF THE PREFERRED EMBODIMENT

Figure 1:
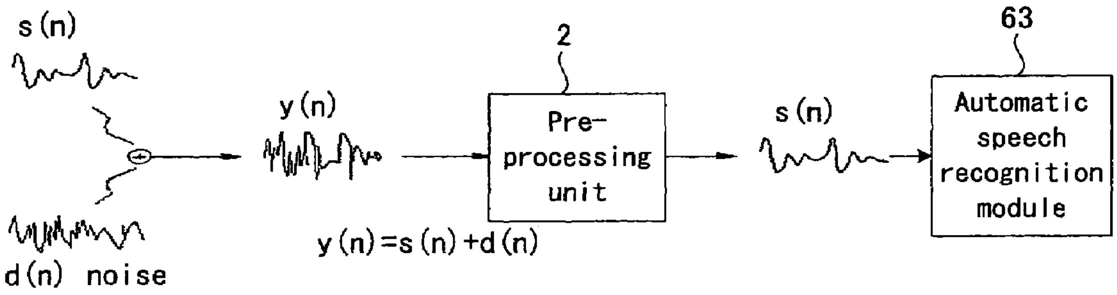
FIG. 1 Prior art
FIG. 1 shows the general principle of the noise signal suppression.
Figure 2:
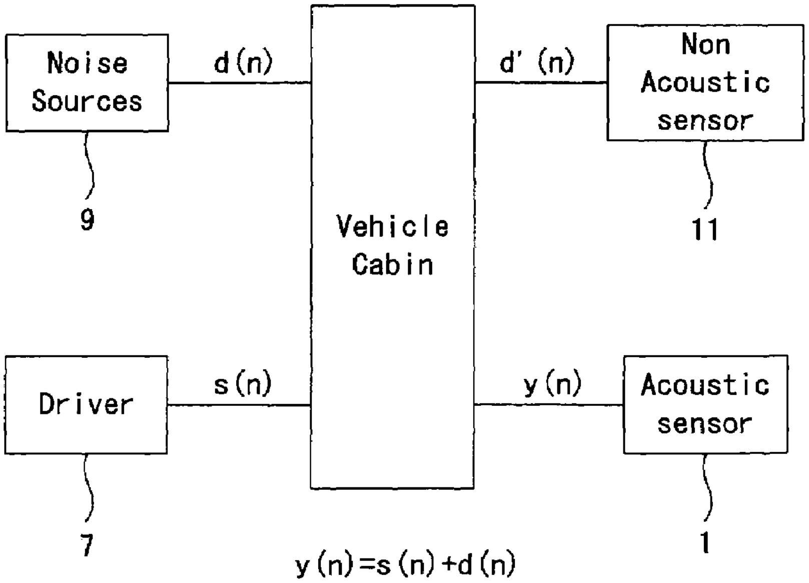
FIG. 2 is a basic schematic of the sources and the sensors in the vehicle cabin for an automatic speech recognition system.

FIG. 2 shows a basic schematic of the sources and the sensors in the vehicle cabin for an automatic speech recognition system. The vehicle cabin comprises at least an acoustic sensor (1), for example a microphone or microphone array, dedicated and positioned in order to sense the speech signal of the vehicle driver (7). When the driver (7) speaks, the driver emits potentially a vocal command signal, called signal of interest s(n), to be interpreted by the automatic speech recognition system to command an operation of the vehicle. Several noise or interferences sources, here represented by the bloc (9), generate a noise signal d(n) which evolves with time as a function of the conditions of the external environment of the vehicle, the driving operations and the conditions in the vehicle cabin.

In FIG. 2, the vehicle cabin is schematically represented by a bloc (4) which corresponds, in fact, to the propagation medium of the signals from the sources to the sensors.

The acoustic sensor (1) receives a signal y(n) composed of the signal of interest s(n) as well as the noise signal d(n).

According to the invention, a sensor or a set of sensors of non acoustic type (11) is also considered for sensing the non acoustic signal d'(n) from noise or interferences sources created by sources like vibrations caused by the tires, the engine and others. The noise non acoustic signal d'(n) sensed by the non acoustic sensor(s) (11) is used as the noise reference signal.

In fact, and in a largely less restrictive manner than assuming stationary noise and interference during the reception of the speech signal, it is possible, in a more realistic way, to consider that this is the propagation through the vehicle cabin of the non acoustic noise signal d'(n) which acts in an almost stationary way. This is indeed principally justified by the fact that in the vehicle cabin, the geometric configuration, the constitution of materials and their acoustic properties remain almost constant during the period of reception of a speech signal. Therefore, the transfer function of propagation of the noise or interference sources towards the sensor(s) is almost stationary for this signal d'(n) during the reception of the signal of interest. Hence, by using the non acoustic noise signal d'(n) provided by the non acoustic sensor(s) (11) and by estimating the propagation transfer function, it is possible to continuously estimate the evolution of the noise signal d(n) without any strong assumption concerning being stationary during the period of reception of speech signal while avoiding the mixing of the signal of interest in the noise reference.

Therefore, it is not necessary to estimate the noise signal itself, but only to estimate the transfer function in a propagation medium which is more stationary and which can more realistically be considered almost stable during the period of reception of the speech signal. It therefore becomes possible to continue estimating and eliminating the noise and the interferences during the reception of the speech signal even if the noise and the interferences continue strongly evolving during the reception of the signal of interest.

Figure 3:
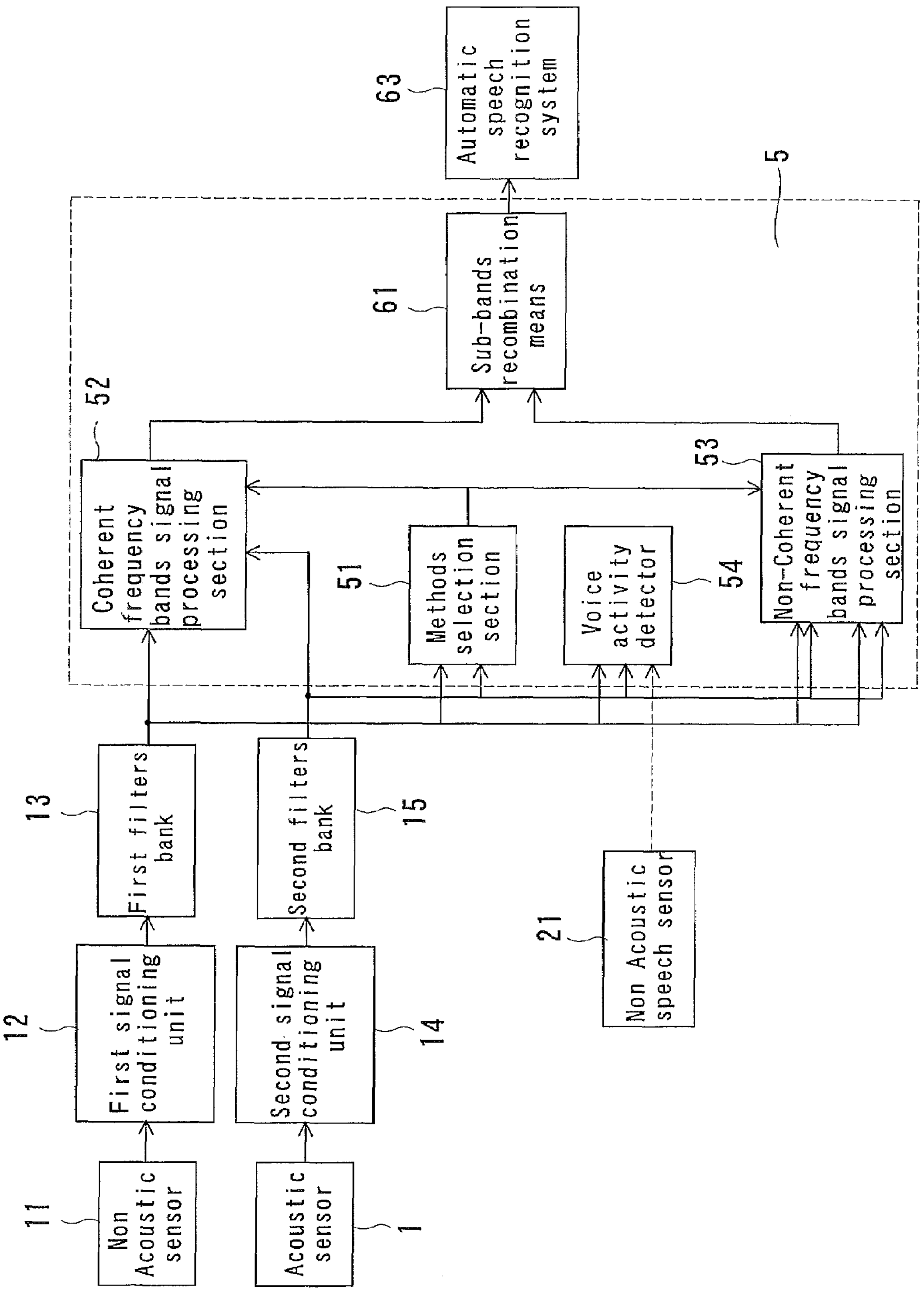
FIG. 3 shows a simplified schematic of the pre-processing system comprising a pre-processing unit according to the invention.

FIG. 3 shows a simplified schematic of the pre-processing system comprising a pre-processing unit according to the invention.

A set of non acoustic sensor(s) (11) is linked to a speech signal pre-processing unit (5) through a first signal conditioning unit (12) and a filter bank (13) having at least one or more filters. The first conditioning unit (12) detects the presence of impulsive components and prevents their propagation in the system before providing the processed signal to the filter bank (13). The filter bank (13) separates the received signal into a plurality of spectral bands allowing, in the following steps, a processing of noise and interferences suppression adapted to the considered spectral band. The different signals obtained in such a way are provided to the pre-processing unit (5).

In parallel, a set of acoustic sensor(s) (1) is linked to the speech pre-processing unit (5) through a second signal conditioning unit (14) and a filter bank (15) having at least one or more filters. The second conditioning unit (14) adapts the received signal as a function of the type of used sensors. For example, if the sensor consists in a microphone array, an array processing is performed allowing conventional techniques to be applied. The processed signal is provided to the filter bank (15). The filter bank (15) separates the received signal into a plurality of spectral bands allowing, in the following steps, a processing of noise and interferences suppression adapted to the considered spectral band. The different signals obtained in such a way are provided to the pre-processing unit (5).

The pre-processing unit (5) according to the invention is now described more in detail. The pre-processing unit (5) comprises several sections which process the received signals according to the properties of the signal. The provided signals to the pre-processing unit (5) are divided into spectral sub-bands to allow an appropriate processing as a function of the considered frequency band.

The pre-processing unit (5) comprises a methods selection section (51). The section (51) selects the method as a function, for example, of the signal band, of the coherence and/or of the situation. Depending on the result of this analysis, the selection section (51) selects a section for processing signals with coherent frequency bands (52) or a section for processing signals with non coherent frequency bands or at least of less coherence, so called hereafter the processing section (53).

The methods selection section (51) measures the coherence of the received signal. If the coherence is high in the signal frequency bands, a suppression method according to the orthogonal principle is used, in the processing section (52), on the received signal y(n) for eliminating the noise with a classical noise. rejection method with multiple references for example by subtraction of an estimation of the signal d'(n) from the received signal y(n) to obtain an estimation of the signal of interest s(n). As many methods are well known by a skilled person, like for example, and in a non exhaustive way, the application of a Wiener filter, this technique is not detailed here.

Figure 4:
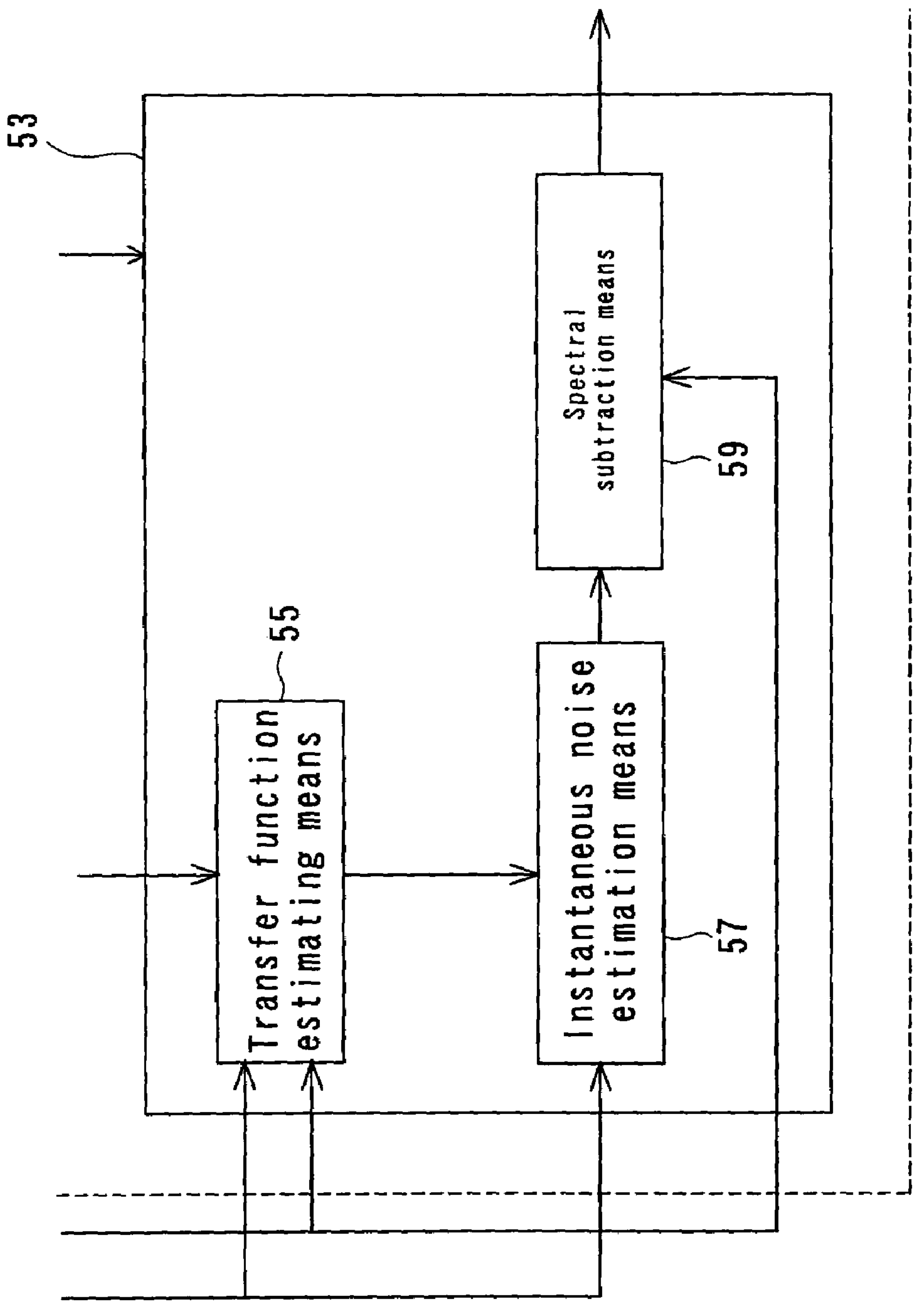
FIG. 4 represents schematically more in detail the section of pre-processing according to the invention.

The processing section (53) comprises an estimation mean of the transfer function (55), an instantaneous noise estimation mean (57), and a spectral subtraction mean (59). FIG. 4 schematically represents the processing unit (53) in more detail.

The transfer function estimation mean (55) receives the signal y(n) composed of the signal of interest and the noise signal. As the propagation medium in a vehicle cabin is almost stationary during the reception of a speech signal, the transfer function can be considered stationary during this period. By measuring the noise sources and by estimating the transfer function, it is then possible to know the evolution of the noise in the cabin. Hence, the noise signal can be continuously known and adapted even during the reception of the signal of interest. This allows defining a more reliable noise reference signal which can be used in a classical noise signal spectral subtraction from the signal of interest in order to obtain a signal with reduced noise. The transfer function estimation mean (55) provides as output the estimated transfer functions which provide themselves instantaneous noise estimation mean (57) as described hereafter.

The instantaneous noise estimation mean (57) receives the noise sources signal and uses the result of the transfer functions estimation mean (55) for updating the estimated noise signal. The instantaneous noise estimation mean (57) provides then, as output, the estimated noise signal, continuously updated, which is provided to the spectral subtraction mean (59).

The spectral subtraction mean (59) is a module dedicated to subtract from the received signal an estimation of the noise spectrum. In this well known technique which will not be detailed hereafter, the short term spectrum of the noise is generally measured during the pauses of the speaker and is used to correct the spectrum of the noisy speech.

Advantageously, the system according to the invention can furthermore include a conventional voice activity detector for automatically deactivating, in the system, the update of the transfer function estimation when the driver of the vehicle begins speaking and can reactivate it when he stops speaking.

Preferably, the voice activity detector is linked to a non acoustic speech sensor in order to improve the sensitivity and the reliability of the voice activity detector.

FIG. 3 shows such a detector, indicated by the reference numeral (54) which is included in the pre-processing unit (5) and which is for receiving the signals from the filter banks (13) and (15). A non acoustic speech sensor (21) is also included and provides a signal to the detector (54).

In order to control the update or the freezing of the estimation of the transfer function in the transfer function estimation mean (55) according to the reception of a speech signal, an update command is provided to the estimation means (55) by the vocal activity detector (54) which received the signal y(n) composed of the signal of interest and of the noise signal and which eventually receives the signal of the non acoustic speech sensor (21), which can be for example a vibration sensor type located close to the driver's seat.

If a speech signal is received, the voice activity detector (54) provides, to the transfer function estimation means (55), a command which leads to a freeze of the estimation and places the transfer function estimation means (55) in a (frozen/halted) mode without update. As long as a speech signal is received, the transfer function is not updated but the noise estimation still continues to be updated due to the instantaneous noise estimation mean (57).

As soon as the speech signal is no longer received, the voice activity detector (54) provides, to the transfer function estimation means (55), a command allowing the update of the estimation and placing the transfer function estimation means (55) in an update mode.

Then, the signals in the sub-bands provided by the coherent frequencies bands signal processing section (52) and by the non coherent frequencies bands signal processing section (53) are recombined in a sub-bands recombination mean (61) in order to provide a temporal signal of interest with reduced noise to the automatic speech recognition system (63).

Obviously, the invention is not limited to the realization mode presented above ad been given only by way of example. Hence, several modifications and/or improvements may be constructed without departing from the spirit and scope of the invention. Accordingly, the invention is limited only as defined in the following claims and equivalents thereof.

What is claimed is:

1. A pre-processing system of a signal of interest in an automatic speech recognition system in an interior space comprising:

at least one non-acoustic sensor for sensing a non-acoustic noise signal existing in the interior space, a first conditioning unit connected to the non-acoustic sensor for conditioning a signal received by the non-acoustic sensor, a first filter bank connected to the first conditioning unit for dividing the received signal into a plurality of sub-bands of frequencies, at least one acoustic sensor for sensing the signal of interest emitting by a person which uses the automatic speech recognition, a second conditioning unit connected to the acoustic sensor for conditioning a signal received by the acoustic sensor, a second filter bank connected to the second conditioning unit for dividing the received signal into a plurality of sub-bands of frequencies, a pre-processing unit connected to the first filter bank and the second filter bank for pre-processing the received signal from the second filter bank for the automatic speech recognition system, wherein a pre-processing unit includes a section for processing signals with coherent frequency bands to suppress the noise from the signal provided by the second filter bank based on the received signals from the first and second filter bank, a section for processing signals with non-coherent frequency bands to suppress the noise from the received signal provided by the second filter bank based on the received signals from the first and second filter bank, a section of method selection for determining coherence properties of the received signal from the first and second filter banks, and for selecting one of the sections for processing signals with coherent frequency bands and the section for processing signals with non-coherent bands as a function of the result of the received signal properties, wherein the section for processing the non-coherent frequencies includes an estimation means for estimating a transfer function of the noise signal through the interior space and instantaneous noise estimation means for receiving the noise signal from the non-acoustic sensor and using the result provided by the estimation means and updating the estimated noise signal, the non-coherent frequencies suppressing the estimated noise signal from the received signals provided by the second filter bank.

2. A pre-processing system of a signal of interest according to claim 1, further comprising a voice activity detector to automatically deactivate update of the transfer function in the estimation means when a signal of interest is detected.

3. A pre-processing system of a signal of interest according to claim 2, further comprising a non-acoustic speech sensor to provide a signal to a voice activity detector.

4. A pre-processing system of a signal of interest according to claim 1, in which the processing section of non-coherent frequency bands comprises a spectral subtraction means for receiving the signal provided by the instantaneous noise estimation means and for subtracting from the received signal an estimation of the noise spectrum.

5. A pre-processing system of a signal of interest according to claim 1, wherein the processing section of coherent frequency bands obtains an estimation of the signal of interest by subtracting an estimation of the noise signal from the received signal provided by the second filter bank.

6. A pre-processing system of a signal of interest according to claim 1, wherein the automatic speech recognition system is an automatic speech recognition system in a vehicle.

7. A pre-processing system of a signal of interest according to claim 1, wherein the estimation means estimates a transfer function of the noise signal through the interior space during reception of the signal of interest.

8. A pre-processing system of a signal of interest according to claim 1, further comprising a sub-bands recombination means for recombine the signals in the sub-bands provided by the section of processing the coherent frequencies bands and by the section of processing non-coherent frequencies bands.

9. A pre-processing system of a signal of interest according to claim 1, wherein the non-acoustic sensor does not sense the signal of interest.

* * * * *